(12) United States Patent
Bailey et al.

(10) Patent No.: US 10,085,067 B2
(45) Date of Patent: Sep. 25, 2018

(54) NETWORK INTERFACE DEVICE WITH DYNAMIC NOISE CONDITIONING

(71) Applicant: PPC BROADBAND, INC., East Syracuse, NY (US)

(72) Inventors: Paul Bailey, Camillus, NY (US); Yan Li, Syracuse, NY (US)

(73) Assignee: PPC BROADBAND, INC., East Syracuse, NY (US)

( * ) Notice: Subject to any disclaimer, the term of this patent is extended or adjusted under 35 U.S.C. 154(b) by 0 days.

(21) Appl. No.: 15/404,540

(22) Filed: Jan. 12, 2017

(65) Prior Publication Data
US 2017/0201778 A1    Jul. 13, 2017

Related U.S. Application Data

(60) Provisional application No. 62/277,688, filed on Jan. 12, 2016, provisional application No. 62/356,756, filed on Jun. 30, 2016.

(51) Int. Cl.
H04N 21/61    (2011.01)

(52) U.S. Cl.
CPC ....... *H04N 21/6168* (2013.01); *H04N 21/615* (2013.01); *H04N 21/6118* (2013.01); *H04N 21/6156* (2013.01)

(58) Field of Classification Search
CPC ....... H04N 21/440254; H04N 21/6168; H04N 21/6118; H04N 21/615; H04N 21/6156
See application file for complete search history.

(56) References Cited

U.S. PATENT DOCUMENTS

| | | | |
|---|---|---|---|
| 4,327,446 | A | 4/1982 | Dressler |
| 8,667,550 | B2 | 3/2014 | Wang |
| 2010/0095344 | A1 | 4/2010 | Newby et al. |
| 2010/0100919 | A1 | 4/2010 | Hsue et al. |
| 2010/0244980 | A1 | 9/2010 | Olson et al. |
| 2010/0251320 | A1 | 9/2010 | Shafer et al. |
| 2010/0251323 | A1 | 9/2010 | Jackson |
| 2013/0223229 | A1 | 8/2013 | Hui et al. |
| 2014/0105221 | A1 | 4/2014 | Bailey et al. |

OTHER PUBLICATIONS

Shane Thomas (Authorized Officer), International Search Report and Written Opinion dated May 23, 2017, PCT Application No. PCT/US2017/015313, filed Jan. 27, 2017, pp. 1-10.
Lee W. Young (Authorized Officer), International Search Report and Written Opinion dated Apr. 6, 2017, PCT Application No. PCT/US2017/013134, filed Jan. 12, 2017, pp. 1-16.

*Primary Examiner* — Hunter B Lonsberry
(74) *Attorney, Agent, or Firm* — MH2 Technology Law Group LLP

(57) ABSTRACT

The present disclosure provides methods and systems for a network interface device including an entry port connected to a cable television (CATV) network. A noise suppressor is provided that improves the detection and differentiation between ingress noise and valid upstream signals. The noise suppressor can gate the upstream path logically and dynamically to pass valid upstream signals, while blocking ingress noise form the CATV network.

24 Claims, 4 Drawing Sheets

NETWORK INTERFACE DEVICE WITH DYNAMIC NOISE CONDITIONING

CROSS REFERENCE TO RELATED APPLICATIONS

This claims priority to U.S. Provisional Patent Application No. 62/277,688, filed Jan. 12, 2016, and U.S. Provisional Patent Application No. 62/356,756, filed Jun. 30, 2016, the contents of which are incorporated herein in their entireties.

FIELD

The present disclosure relates to cable television (CATV) networks, and more particularly to a CATV network interface device which interconnects subscriber equipment at a subscriber's premises to the CATV network infrastructure.

BACKGROUND

CATV networks supply and distribute high frequency "downstream" signals from a main signal distribution facility, known as a "headend," to premises (e.g., homes and offices) of subscribers. The downstream signals can be provided to subscriber equipment, such as televisions, telephones, and computers. In addition, most CATV networks also receive "upstream" signals from subscriber equipment back to the headend of the CATV network. For example, a set top box can send an upstream signal including information for selecting programs for viewing on a television. Also, upstream and downstream signals are used by personal computers connected through the CATV infrastructure to the Internet. Further, voice over Internet protocol (VOIP) telephones use upstream and downstream signals to communicate telephone conversations.

CATV networks use filters and other components to reduce or eliminate unwanted signals that enter the CATV network from external sources, such as subscriber equipment. These undesirable external signals, known as "ingress noise," can degrade valid signals and general quality of the CATV network. The most intense range of undesirable ingress noise signals is in the frequency band of 0-15 megahertz (MHz). This range overlaps those of valid upstream CATV signals, which have a frequency band of 5-42 MHz. Because these signals can occupy the same frequency band and originate from approximately the same location, it is extremely difficult to filter undesirable ingress noise from valid upstream signals.

Additionally, because valid downstream CATV signals are within a frequency band of 54-1000 MHz, the ingress noise frequency band of 0-15 MHz does not overlap and can be suppressed by downstream filters. Even so, the ingress noise can still have adverse influence on the valid downstream signals because ingress noise from individual subscribers accumulates as a substantial underlying level of base noise on the CATV network. To distinguish valid CATV signals from the base noise, the valid CATV signals are typically amplified above the base noise level. However, a high level of base noise may cause signal amplifiers to clip or distort both the valid downstream and upstream signals during amplification and retransmission of those signals, which reduces the information contained in those valid signals, and thereby diminishes the quality of service experienced by subscribers.

SUMMARY

The present disclosure provides methods and systems for a network interface device. A network interface device consistent with the present disclosure includes an entry port configured to connect to a cable television (CATV) network. The device also includes an input/output port configured to connect to subscriber equipment. The device further includes a downstream path configured to communicate a downstream signal from the entry port to the input/output port. The device further includes an upstream path configured to communicate an upstream signal from the input/output port to the entry port. The device further includes a noise suppressor in the upstream path and comprising a plurality of noise suppression paths, the noise suppressor being configured to switch the upstream signal between the noise suppression paths. The device further includes a controller configured to determine an instantaneous power level of a potential signal in the upstream path. The controller is also configured to determine a continuous power level of the potential signal in the upstream path. The controller is further configured to determine that there is currently an upstream signal in the signal path based on the continuous power level of the potential signal of the potential signal or the instantaneous power level of the potential signal. The controller is further configured to compare the continuous power level and the instantaneous power level. The controller is further configured to determine a dynamic ingress noise threshold based on the comparison of the continuous power level and the instantaneous power level. The controller is further configured to determine a signal-to-noise ratio of the upstream signal. The controller is further configured to comparing the signal-to-noise ratio with the dynamic ingress noise threshold. The controller is further configured to output a control signal to the noise suppressor selecting one of the plurality of noise suppression paths based on the comparing of the signal-to-noise ratio with the dynamic ingress noise threshold. The noise suppressor is configured to switch the upstream signal to the selected one of the noise suppression paths.

Embodiments of consistent with the present disclosure provides a network interface device, including an upstream signal path configured to carry an upstream signal from an input-output port of the network interface device to an entry port of the network interface device. The network interface device also includes a noise suppressor in the upstream path comprising a plurality of noise suppression paths between the input-output port and the entry. The network interface device further includes a controller configured to dynamically determine a threshold value based on a power level of the upstream signal, select one of the plurality of noise suppression paths based on the threshold value, and cause the noise suppressor to direct the upstream signal to the selected one of the plurality of noise suppression paths.

Additionally, embodiments of consistent with the present disclosure provide a method for dynamically controlling ingress noise with a network interface device. The method includes determining a dynamic noise threshold based on a power level of a signal communicated by a signal path between a first port of the network interface device and a second port of the network interface device. The method further includes selecting one of several noise suppression paths based on the dynamic noise threshold.

Other and different statements and aspects of the invention appear in the following claims. A more complete appreciation of the present invention, as well as the manner in which the present invention achieves the above and other improvements, can be obtained by reference to the following detailed description of a presently preferred embodiment

DETAILED DESCRIPTION

Devices and methods in accordance with the present disclosure inhibit the amount of ingress noise introduced from subscriber equipment to a CATV network while avoiding loss of information in valid upstream signals. Network interface devices consistent with the present disclosure may detect and differentiate between ingress noise and valid transmission in an upstream signal by dynamically determining an ingress noise threshold. Additionally, the interface devices selectively route the upstream signal through one of a number of noise suppression paths based on the dynamic ingress noise threshold.

Figure 1:
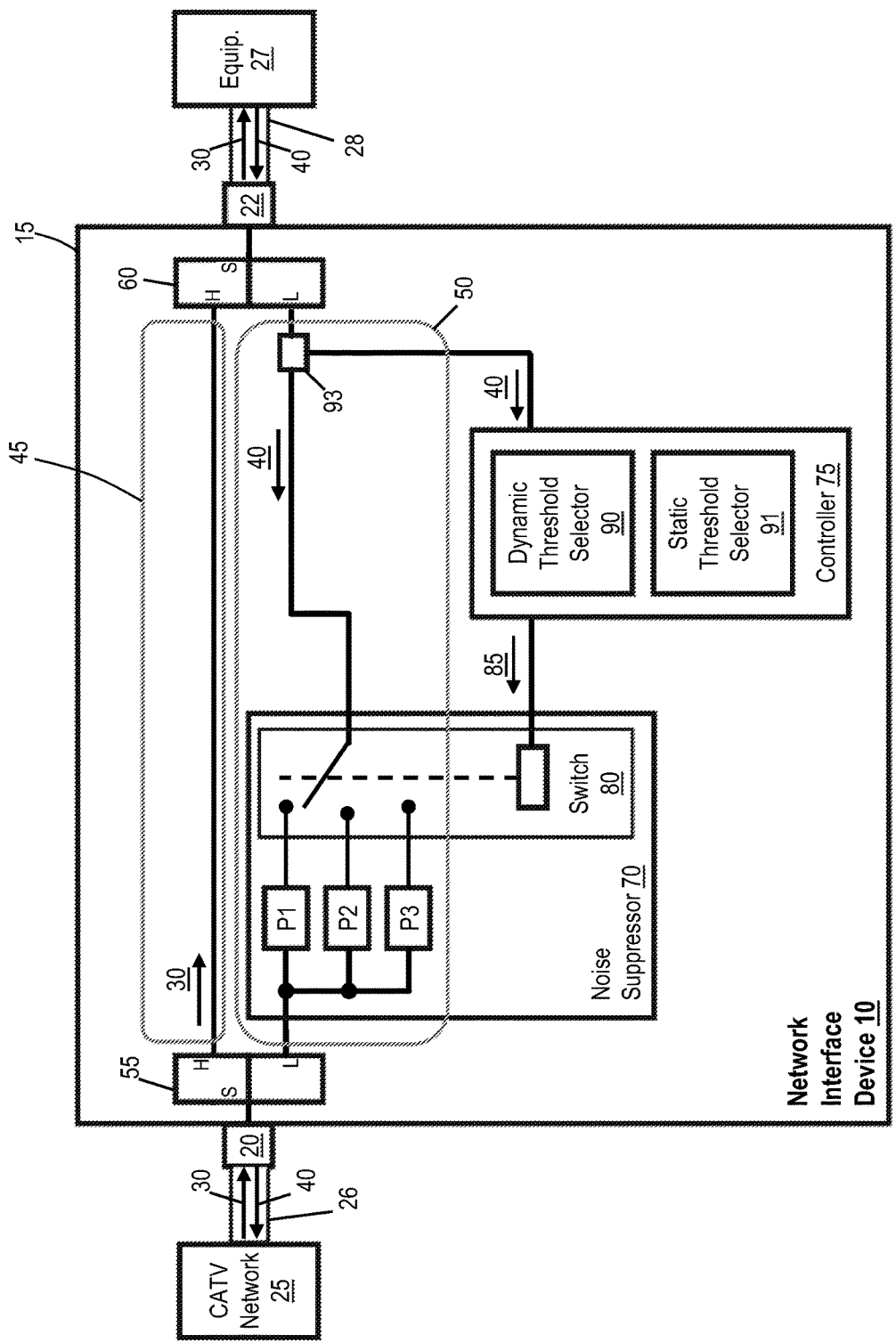
FIG. 1 is a functional block diagram illustrating an exemplary network interface device in accordance with aspects of the present disclosure.

FIG. 1 illustrates a functional block diagram of a network interface device 10 in accordance with aspects of the present disclosure. The network interface device 10 includes a housing 15 having entry port 20 and an input-output port 22. The network interface device 10 can be connected to a CATV network 25 via the entry port 20. A downstream signal 30 originating from programming sources at a head-end of the CATV network 25 can be conducted to the interface device 10 through the entry port 20 via a drop cable 26. The network interface device 10 can provide the downstream signal 30 to equipment 27 via the input/output port 22 and subscriber cable 28. The equipment 27 can be one or more devices of a subscriber of CATV network 25, such as VOIP telephones, television sets, and/or data modems. In the reverse direction, the equipment 27 can communicate with the CATV network 25 via the interface device 10 by conducting an upstream signal 40 to the input-output port 22. The network interface device 10 can conduct the upsignal 40 to the CATV network 25 via the entry port 20.

The network interface device 10 includes a downstream path 45 and an upstream path 50 that communicate the downstream signal 30 and the upstream signal between the CATV network 25 and the equipment 27 via the entry port 20 and the input-output port 22, respectively. The downstream signal path 45 and the upstream signal path 50 are physical (e.g., wired) communication links that electrically connect the entry port 20 and the input-output port 22. An upstream diplexer 55 and a downstream diplexer 60 can be connected to the entry port 20 and the input-output port 22, respectively. The upstream diplexer 55 and the downstream diplexer 60 can split the downstream signal 30 and the upstream signal 40, respectively. For example, the upstream and downstream signals 30, 40 may be conducted together in drop cable 26 and subscriber cable 28, and then split by the upstream and downstream diplexers 55, 60, respectively, such that they are separately communicated within the housing 15 though a respective one of the downstream signal path 45 and the upstream signal path 50. Additionally, the upstream diplexer 55 and the downstream diplexer 60 can combine the downstream signal 30 and the upstream signal 40 for transmission together on drop cable 26 and subscriber cable 28.

In implementations, the downstream signal path 45 can directly communicate the downstream signal 30 from the entry port 20 to the input-output port 22 without any intervening components or devices. However, it is understood that other implementations of the downstream signal path 45 can include one or more components for amplifying, conditioning, and/or splitting the downstream signal 30.

In accordance with aspects of the present disclosure, the upstream signal path 50 includes a noise suppressor 70 and a controller 75 that dynamically filter the upstream signal 40 to suppress ingress noise. The noise suppressor 70 includes a switch 80 that receives the upstream signal 40 from the input-output port 22 (e.g., from equipment 27 via diplexer 60) and selectively directs it through one of a number of noise suppression paths P1, P2, P3, based on a control signal 85 from the controller 75. The noise suppression paths P1, P2, P3 apply different levels of filtering to the upstream signal 40 according to an evaluation of the ingress noise included by the controller 75. In implementations, the noise suppression path P1 entirely blocks to upstream signal 40 when, for example, excessive ingress noise is included in the upstream signal 40, or when no upstream signal 40 is detected. The noise suppression path P2 provides no filtering to the upstream signal 40 when, for example, noise included in the signal is substantially limited to low and/or random ingress noise. Further, the noise suppression path P3 filters-out a portion of the upstream signal 40 over particular frequency range (e.g., 0-5 MHz) when, for example, noise included in the signal is substantially limited to moderate to high ingress noise. While the noise suppressor 70 is illustrated as including three paths, some of implementations of the noise suppressor 70 can include only two paths and other implementations can include greater than three paths.

The controller 70 includes signal processing devices and/or data processing devices that evaluate noise included in the upstream signal 40 and outputs the control signal 85$s$, which controls the noise suppressor 70 to select one of the noise suppression paths P1, P2, P3. The controller 70 can receive a portion of the upstream signal 40 from the upstream signal path 50 from the input-output port 22 via a splitter device 93, which can be, e.g., a one-in, two-out splitter, a directional coupler, or a tap resistor. Using the upstream signal 40, the controller 70 can determine an instantaneous signal power level and a continuous signal power level. In implementations, the controller 75 can determine the continuous signal power level by storing and averaging the instantaneous power level of the upstream signal 40 for a duration that is substantially longer than the longest valid upstream data transmission. For example, in some implementations the duration can be between about 200 milliseconds to about 300 milliseconds (e.g., about 250 milliseconds). In other implementations, the duration can be about ten-times (10×) the duration of a longest valid signal to prevent valid signals from contributing significant power to the averaging. For example, the duration can between about 2.0 seconds and about 3.0 seconds (e.g., 2.5 seconds).

In implementations, the controller 70 includes a dynamic threshold selector 90 and a static threshold selector 91. The dynamic threshold selector 90 determines a dynamic ingress noise threshold for the upstream signal 40 based on the continuous power level of the upstream signal 40. The static threshold selector 91 sets a predetermined static ingress noise threshold.

Based on the dynamic threshold and the static threshold, the controller 75 selects one of the noise suppression paths P1, P2, P3. In implementations, if the controller 75 determines that the upstream signal 40 has a high signal-to-noise ratio (e.g., less than about 15 dB), then the controller 75 controls the switch 80 to select noise suppression path P1, which blocks the upstream signal 40. Additionally, the controller 75 can select noise suppression path P1 if it does not detect any upstream signal 40. In implementations, noise suppression path P1 can an open circuit or it can be terminated to ground potential, to a high attenuation device, or to a damping device. If the controller 75 determines that the upstream signal 40 has a high signal-to-noise ratio (e.g., greater than about 20 dB), then the controller 75 controls the switch 80 of the noise suppressor to select noise suppression path P2, which passes the upstream signal 40 without any filtering or amplification. If the controller 75 determines that the upstream signal 40 has a moderate to high signal-to-noise ratio (e.g., from about 15 dB to about 20 dB), then the controller 75 controls the switch 80 to select noise suppression path P3, which conditions (e.g., filters) the upstream signal 40 to suppress noise. For example, the noise suppression path P3 can include an attenuator, an equalizer and/or a filter to reduce noise in the upstream signal 40 provided to the entry port 20.

Figure 2:
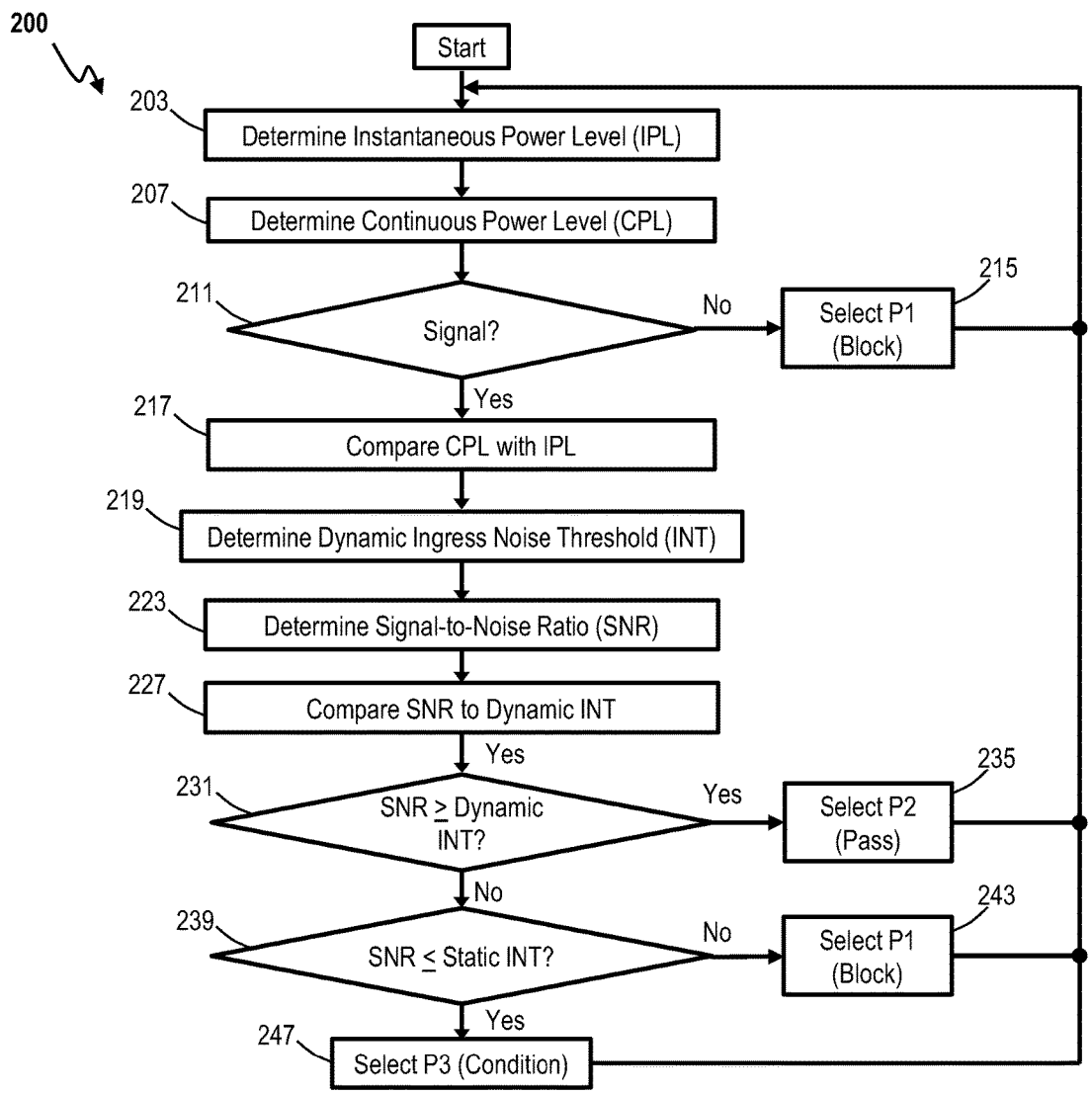
FIG. 2 is a flow chart illustrating an exemplary process for dynamically controlling ingress noise with an interface device in accordance with aspects of the present disclosure.

FIG. 2 illustrates a flow diagram of a process 200 for dynamically controlling ingress noise with a network interface device (e.g., interface device 10) in accordance with aspects of the present disclosure. At 203 the process 200 determines (via, e.g., controller 75) an instantaneous power level ("IPL") of a potential signal in a signal path (e.g., of upstream signal 40 received from upstream signal path 50). At 207 the process 200 determines a continuous power level ("CPL") of the potential signal. For example, the continuous power level can be an average of a number instantaneous power levels recorded over a predetermined duration (e.g., about 250 milliseconds or about 2.5 seconds). At 211 the process 200 determines whether there is currently a signal in the signal path based on the continuous power level determined at 203 and/or based on the instantaneous power level determined at 207. For example, if the instantaneous power level is a range between about 4 dBmV (decibel-millivolts) and 6 dBmV (e.g., about 5 dBmV), then it may be determined that no signal is currently being provided by the signal path. In such case (i.e., 211, "No"), then at 215 the process 200 routes (e.g., using switch 80) the signal path to a first noise suppression path (e.g., noise suppression path P1) that disconnects or terminates the signal path. By doing so, the process 200 avoid contributing to base noise within a CATV network.

If it is determined at 211 that there is a signal in the signal path ("Yes"), then at 217 the process 200 compares the continuous power level determined at 207 with the instantaneous power level determined at 203. At 219, the process 200 determines a dynamic ingress noise threshold ("INT") for the signal based on the comparison at 217.

At 223 the process 200 determines the signal-to-noise ratio of the signal detected at 211. At 227 the controller compares the signal-to-noise ratio determined at 223 with the dynamic ingress noise threshold ("dynamic INT") determined at 219. At 231 the process determines whether the signal-to-noise ratio determined at 223 exceeds the dynamic ingress threshold determined at 219. If it is determined at 231 that the signal-to-noise ratio is greater than or equal to the dynamic ingress noise threshold ("Yes"), then at 235 the process 200 routes the signal to a second noise suppression path (e.g., noise suppression path P2). The second noise suppression path may pass the upstream signal to an upstream port (e.g., entry port 20) without any filtering, attenuation, or other conditioning to address the ingress noise.

If it is determined at 231 that the signal-to-noise ratio is less than the dynamic ingress noise threshold ("No"), then at 239 the process 200 determines whether the signal-to-noise ratio is less than or equal to a static ingress noise threshold (static INT). The static ingress noise threshold may be a predetermined value defining a high noise level, which may represent a condition in which the upstream signal should be blocked to prevent transmission of excessive noise into the CATV network.

If it is determined at 239 that the signal-to-noise ratio is greater than the static ingress noise threshold ("No"), then at 243 the process 200 routes the signal path to the first noise suppression path (i.e., noise suppression path P1) as described above with regard to 215. If it is determined at 239 that the signal-to-noise ratio is less than or equal to a static ingress noise threshold, then at 247 the process 200 routes the signal to a third noise suppression path (e.g., noise suppression path P3), which conditions the upstream signal to filter the ingress noise, as previously described herein. For example, the third noise suppression path may include a high-pass filter device that attenuates or blocks frequencies below about 5 MHz. Also, the third noise suppression path may use an attenuator to attenuate such frequency band including the signal and the noise, for example, to cause a device (e.g., a modem) to drive a stronger signal until the signal-to-noise ratio is met).

After routing the signal path to one of the noise suppression paths as described in 215, 235, 243, and 247 as described above, the process 200 may return to the start and repeat. By doing so, the process 200 iteratively determines and applies the dynamic ingress noise threshold based on current situation with regard to the valid upstream signal and ingress noise.

Figure 3:
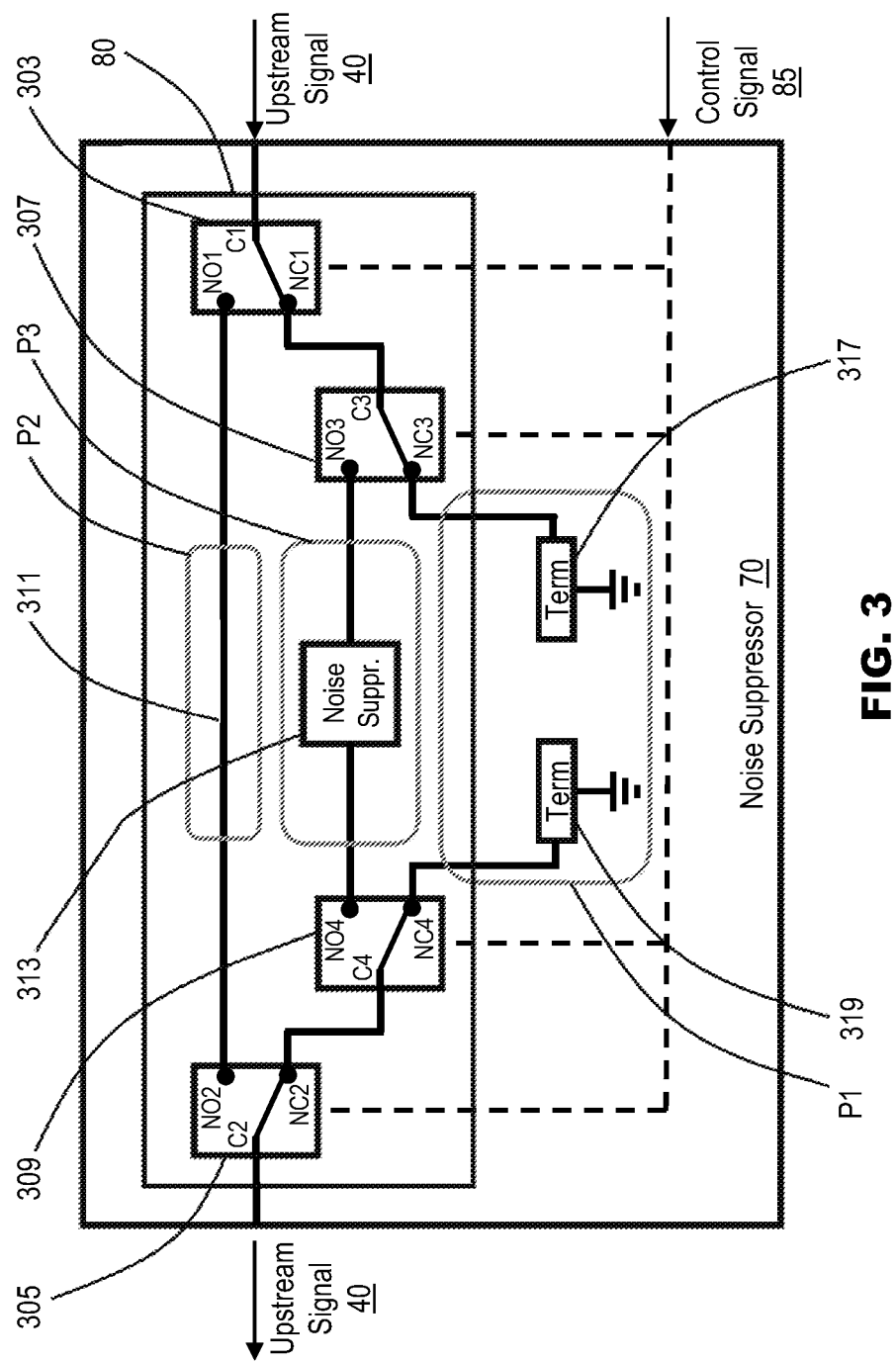
FIG. 3 is a functional block diagram illustrating an exemplary noise suppressor in accordance with aspects of the present disclosure.

FIG. 3 illustrates a functional block diagram of an example of a noise suppressor 70 in accordance with some implementations of the present disclosure. The noise suppressor 70 includes a switch 80 that selectively routes an upstream signal 40 through one of a noise suppression paths P1, P2, P3 based on a control signal 85, in a same or similar manner to that previously described herein. The switch 80 can include relays 303, 305, 307, and 309. Additionally, the noise suppressor 70 can include a conductor 311, a noise suppression device 313, and terminators 317 and 319 in the noise suppression paths P1, P2, and P3, respectively.

The relays 303 and 305 and relays 307 and 309 can be pairs of normally open, single-pole, dual-throw ("SPDT") relays which can be activated by the control signal 85. In implementations, the relays 303 and 305 and relays 307 and 309 are radio frequency relays that switch almost instantaneously in response to the assertion of the control signal 85 so as to prevent loss of information from the upstream signal 40 during switching.

The control signal 85 can selectively cause the switch 80 to route the upstream signal 40 to the noise suppression path P1 via the common terminal C1 of the relay 303, the normally-closed terminal NC1 of the relay 303, the common terminal C3 of the relay 307, the normally-closed terminal NC3 of the relay 307, and the terminator 317. Additionally, to block any signals in flowing in the direction reverse from the upstream signal 40, the noise suppression path P1 can also include the terminator 319, the normally-closed terminal NC4 of the relay 309, the common terminal C4 of the relay 309, the normally-closed terminal NC2 of the relay 305, and the common terminal C2 of the relay 305. The terminators 317 and 319 can be, for example, 75 ohm terminators.

Also, the control signal 85 can selectively activate the switch 80 to route the upstream signal 40 to the noise suppression path P2 via the common terminal C1 of the relay 303, the normally-open terminal NO1 of the relay 303, the normally-open terminal NO1 of the relay 305, and the common terminal C2 of the relay 305. The activated positions of the relays 303 and 305 can establish a direct connection over the conductor 311.

Further, the control signal 85 selectively can cause the switch 80 to route the upstream signal 40 to the noise suppression path P3 by activating relays 307 and 309. For example, the upstream signal 45 may pass via the common terminal C1 of the relay 303, the normally-closed terminal NC1 of the relay 303, the common terminal C3 of the relay 307, the normally-open terminal NO3 of the relay 307, the noise suppression device 313, the normally-open terminal NO4 of the relay 309, the common terminal C4 of the relay 309, the normally closed terminal NC2 of the relay 305, and the common terminal C2 of the relay 305. The noise suppression device 313 can include a passive components and/or active components configured to filter the ingress noise from the upstream signal 40 in a range between about 0 MHz and about 5 MHz. In implementations, the range can be between about 0 MHz and about 10 MHz. In other implementations, the range can be between about 0 MHz and about 15 MHz. And in still other implementations the range can extend from about 0 MHz to above 15 MHz.

As described above and illustrated in FIG. 3, the noise suppressor 70 can selectively route the upstream signal 40 to one of three different noise suppression paths P1, P2, and P3 based on the control signal. It is understood, however, that the noise suppressor 70 can include more than three paths. For example, relays 307 and 309 can be three-pole switches that feed two noise suppression devices, such as noise suppression device 313. In such an implementation, each noise suppression device can be configured to filter the upstream signal over a different range of frequencies (e.g., 0-5 MHz and 0-15 MHz, or 0-5 MHz and 6-15 MHz).

Figure 4:
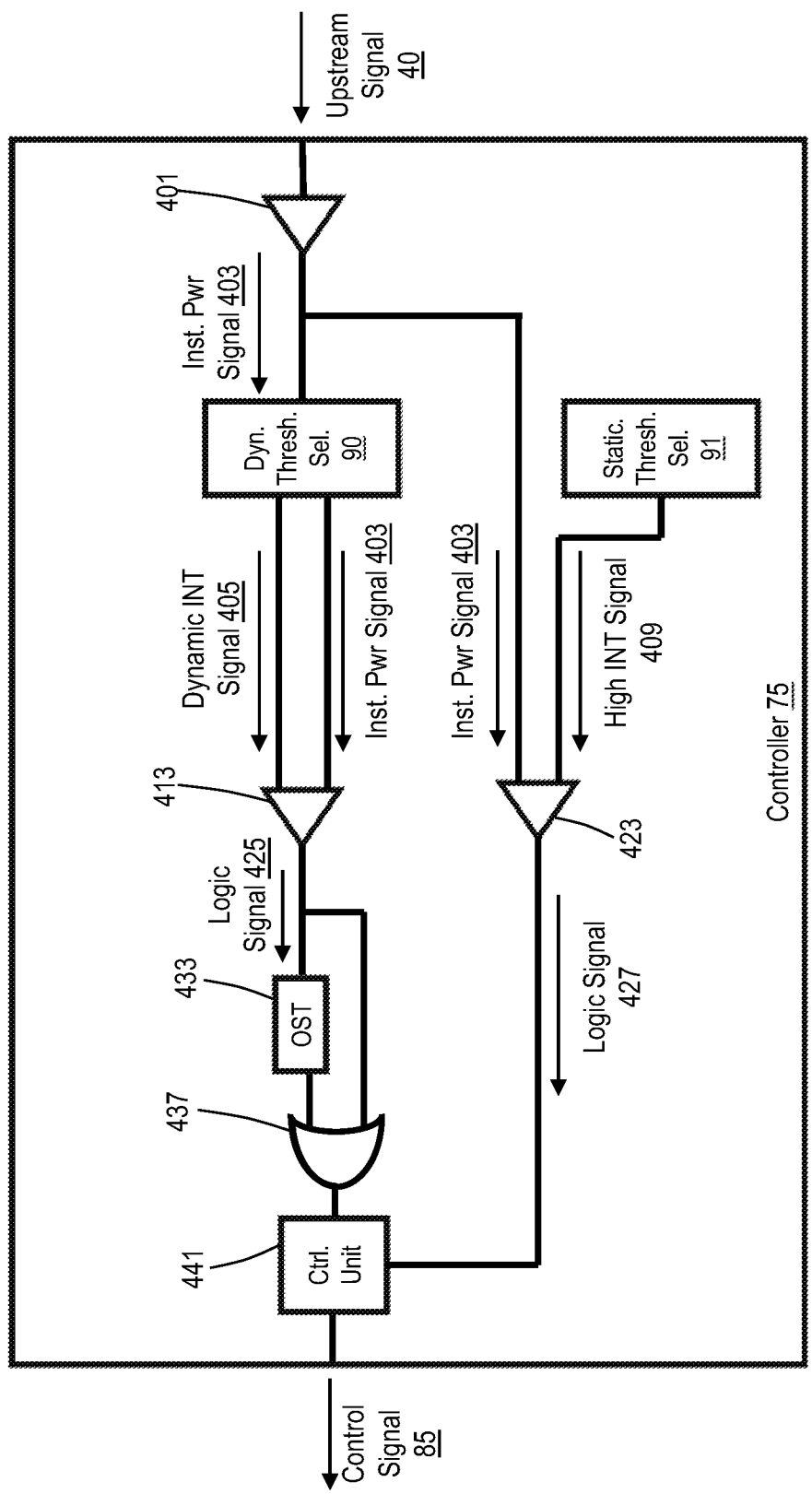
FIG. 4 is a functional block diagram illustrating an exemplary controller in accordance with aspects of the present disclosure.

FIG. 4 illustrates a functional block diagram of an example controller 75 in accordance with some implementations of the present disclosure. The controller 75 determines a control signal 85 for controlling a relay (e.g., switch 80) to selectively route the upstream signal 40 through one of a number of noise suppression paths (e.g., noise suppression paths P1, P2, P3) as previously described herein. The controller 75 includes a dynamic threshold selector 90 and a static threshold selector 91, which can be the same or similar to those previously described herein. In implementations, the controller 75 receives the upstream signal 40 and provides it to an input terminal of a log amplifier detector 401. The log amplifier detector 401 converts the instantaneous magnitude of power of the upstream signal 40 to an instantaneous power signal 403 having a DC voltage. The dynamic threshold detector 90 can receive the instantaneous power signal 403 from an output terminal of the log amplifier detector 401. The dynamic threshold selector 90 can include a microcontroller, timer, or counter circuit that sample and/or average the instantaneous power signal 403 over a predetermined duration to determine a continuous magnitude of power of the upstream signal 40. Further, the dynamic threshold detector 90 can determine a dynamic ingress noise threshold signal 405 by adding to a predetermined signal-to-noise ratio offset that is compared to the instantaneous signal level as one gating criteria.

When the instantaneous power signal 403 of an upstream signal 40 exceeds the dynamic ingress noise threshold signal 405, the resulting logic high signal 425 from the comparator 413 triggers a one-shot timer 433. At substantially the same time, the logic high signal 425 is applied to an input terminal of an OR gate 437 via one-shot timer 433. The internal time constant of the one-shot timer 433 can be equal to the amount of time to transmit a single valid upstream signal packet of the maximum time duration permitted by the signaling protocol, plus a slight additional amount of time to account for inherent tolerances in the components and the timing of the one-shot timer 433. In this manner, the one-shot timer 433 ensures that the relays (e.g., in switch 80) assume their activated positions for a long enough time to conduct a maximum-length upstream signal or packet.

Additionally, the instantaneous power signal 403 from the log amp detector 401 is provided to one terminal of a comparator 423. A high ingress noise threshold ("INT") signal 409 is applied to the other input terminal of the comparator 423, which compares it to a high ingress noise threshold ("INT") signal 409 provided to the other input terminal of the comparator by the static threshold selector 91. The static threshold selector 91 can include a resistor divider network (e.g., a potentiometer and a resistor connected in series, or from a voltage source) that predetermines the high ingress noise threshold signal 409. The high ingress noise threshold signal 409 establishes the level at which the comparator 423 outputs a logic signal 427 at a high-logic level. Conversely, when the instantaneous power signal 403 is greater than the high ingress noise threshold signal 409, the comparator 423 outputs the logic signal 427 at a high-logic level.

A control unit 441 receives the logic signal 425 and the logic signal 427, and outputs the control signal 85. The control unit 441 includes hardware logic and/or software logic that selects one of a number (e.g., 3) of logic states for controlling the relay (e.g., switch 80). For example, the control unit 441 can include one or more logic gates. In other cases, the control unit 441 can include an information processor that selects a logic state based on a lookup table.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. The present disclosure is not to be limited in terms of the particular embodiments described in this application, which are intended as illustrations of various aspects. Many modifications and variations can be made without departing from its spirit and scope, as will be apparent to those skilled in the art. Functionally equivalent apparatuses within the scope of the disclosure, in addition to those enumerated herein will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." In addition, where features or aspects of the disclosure are described in terms of Markush groups, those skilled in the art will recognize that the disclosure is also thereby described in terms of any individual member or subgroup of members of the Markush group.

What is claimed is:

1. A network interface device for dynamically controlling ingress noise, the network interface device comprising:
    an entry port configured to connect to a cable television (CATV) network;
    an input/output port configured to connect to subscriber equipment;
    a downstream path configured to communicate a downstream signal from the entry port to the input/output port;
    an upstream path configured to communicate an upstream signal from the input/output port to the entry port;
    a noise suppressor in the upstream path and comprising a plurality of noise suppression paths, the noise suppressor being configured to switch the upstream signal between the plurality of noise suppression paths; and
    a controller configured to:
        determine an instantaneous power level of a potential signal in the upstream path;
        determine a continuous power level of the potential signal in the upstream path;
        determine that there is currently an upstream signal in the signal path based on the continuous power level of the potential signal of the potential signal or the instantaneous power level of the potential signal;
        compare the continuous power level and the instantaneous power level;
        determine a dynamic ingress noise threshold based on the comparison of the continuous power level and the instantaneous power level;
        determine a signal-to-noise ratio of the upstream signal;
        compare the signal-to-noise ratio with the dynamic ingress noise threshold; and
        output a control signal to the noise suppressor selecting one of the plurality of noise suppression paths based on the comparing of the signal-to-noise ratio with the dynamic ingress noise threshold, wherein the noise suppressor is configured to switch the upstream signal to the selected one of the plurality of noise suppression paths.

2. The network interface device of claim 1, wherein the controller is configured to determine the continuous power level by determining an average value of a number instantaneous power level values recorded over a predetermined duration.

3. The network interface device of claim 1, wherein the plurality of noise suppression paths of the noise suppressor comprise:
    a first noise suppression path configured to pass the upstream signal without conditioning the upstream signal;
    a second noise suppression path configured to block the upstream signal; and
    a third noise suppression path configured to filter-out a portion of the upstream signal over particular frequency range.

4. The network interface device of claim 3, wherein the controller is further configured to:
    determine whether the upstream path includes any signals; and
    select, using the control signal, the second noise suppression when the controller determines that the upstream path lacks at least one signal.

5. The network interface device of claim 3, wherein the controller is further configured to select, using the control signal, the first noise suppression path in response to determining that a signal-to-noise ratio of the upstream signal is greater than about 20 decibels.

6. The network interface device of claim 3, wherein the controller is further configured to select, using the control signal, the second noise suppression path when the signalto-noise ratio is less than the dynamic ingress threshold and the signal-to-noise ratio is greater than the static ingress noise threshold.

7. The network interface device of claim 3, wherein the controller is further configured to select, using the control signal, the third noise suppression path when the signal-to-noise ratio is greater than or equal to the dynamic ingress threshold and the signal-to-noise ratio is less than or equal to the static ingress noise threshold.

8. A network interface device, comprising:
an upstream signal path configured to carry an upstream signal from an input-output port of the network interface device to an entry port of the network interface device;
a noise suppressor in the upstream path, the noise suppressor comprising a plurality of noise suppression paths configured to selectively connect the input-output port with the entry port; and
a controller configured to:
dynamically determine a threshold value based on a power level of the upstream signal;
select one of the plurality of noise suppression paths based on the threshold value; and
cause the noise suppressor to direct the upstream signal to the selected one of the plurality of noise suppression paths,
wherein the plurality of noise suppression paths comprise:
a first noise suppression path configured to apply a first level of filtering to the upstream signal,
a second noise suppression path configured to apply a second level of filtering to the upstream signal, and
a third noise suppression path configured to apply a third level of filtering to the upstream signal.

9. The network interface device of claim 8, wherein noise suppressor comprises a switch configured to:
receive the upstream signal from the input-output port; and
direct the upstream signal to one of the plurality of noise suppression paths based on a control signal from the controller.

10. The network interface device of claim 8, wherein each of the plurality of noise suppression paths applies a different level of filtering to the upstream signal.

11. The network interface device of claim 10, wherein the first noise suppression path of the plurality of noise suppression paths entirely blocks to upstream signal.

12. The network interface device of claim 11, wherein the controller is further configured to select the first noise suppression path in response to determining that a signal-to-noise ratio of the upstream signal is less than about 15 decibels.

13. The network interface device of claim 11, wherein the controller is further configured to select the first noise suppression path in response determining an absence of the upstream signal.

14. The network interface device of claim 10, wherein the second noise suppression path provides no filtering to the upstream signal.

15. The network interface device of claim 14, wherein the controller is further configured to select the second noise suppression path in response to determining that a signal-to-noise ratio of the upstream signal is greater than about 20 decibels.

16. The network interface device of claim 10, wherein the third noise suppression path filters-out a portion of the upstream signal over particular frequency range.

17. The network interface device of claim 16, wherein the controller is further configured to select the third first noise suppression path in response to determining that a signal-to-noise ratio of the upstream signal is between about 15 decibels and about 20 decibels.

18. The network interface device of claim 8, wherein the controller is further configured to:
compare noise included in the upstream signal to the threshold value; and
generate, based on the comparison, a control signal, wherein the noise suppressor is configured to select one of the plurality of noise suppression paths based on the control signal.

19. The network interface device of claim 18, wherein comparing the noise included in the upstream signal comprises:
determine an instantaneous signal power level of the upstream signal; and
determining a continuous signal power level of the upstream signal.

20. A method for dynamically controlling noise by a network interface device, the method comprising:
determining a dynamic noise threshold based on a power level of a signal communicated by a signal path between a first port of the network interface device and a second port of the network interface device; and
selecting one of a plurality of noise suppression paths based on the dynamic noise threshold,
wherein determining the dynamic noise threshold comprises:
determining an instantaneous power level of the signal in the signal path;
determining a continuous power level of the signal in the signal path;
comparing the continuous power level and the instantaneous power level; and
determining the dynamic noise threshold based on the comparing the continuous power level and the instantaneous power level.

21. A method for dynamically controlling noise by a network interface device, the method comprising:
determining a dynamic noise threshold based on a power level of a signal communicated by a signal path between a first port of the network interface device and a second port of the network interface device; and
selecting one of a plurality of noise suppression paths based on the dynamic noise threshold, wherein selecting one of the plurality of noise suppression paths comprises:
determining a signal-to-noise ratio of the signal;
comparing the signal-to-noise ratio with the dynamic noise threshold; and
routing the signal to one of a plurality of noise suppression paths based on the comparing of the signal-to-noise ratio with the dynamic noise threshold.

22. The method of claim 21, wherein:
comparing the signal-to-noise ratio with the dynamic noise threshold comprises determining that the signal-to-noise ratio is greater than or equal to the dynamic noise threshold; and
routing the signal comprises selecting a first noise suppression path of the plurality of noise suppression paths, the first noise suppression path configured to pass the signal without conditioning of the signal.

23. The method of claim 21, wherein:
comparing the signal-to-noise ratio with the dynamic noise threshold comprises:

determining that the signal-to-noise ratio is less than the dynamic threshold; and determining that the signal-to-noise ratio is greater than the static noise threshold, and routing the signal comprises selecting a second noise suppression path of the plurality of noise suppression paths, the second noise suppression path configured to block the signal.

24. The method of claim 21, wherein:

comparing the signal-to-noise ratio with the dynamic noise threshold comprises:

determining that the signal-to-noise ratio is less than the dynamic threshold; and determining that the signal-to-noise ratio is less than or equal to a static noise threshold, and routing the signal comprises selecting a third noise suppression path of the plurality of noise suppression paths, the third noise suppress path configured to condition the signal.

* * * * *